United States Patent
Anand et al.

(10) Patent No.: US 10,439,962 B2
(45) Date of Patent: Oct. 8, 2019

(54) PACKET PROCESSING IN AN OPENFLOW SWITCH

(71) Applicant: Telefonaktiebolaget LM Ericsson (publ), Stockholm (SE)

(72) Inventors: Prashant Anand, Bangalore (IN); Mark Hlady, San Jose, CA (US); Dirk Kampmann, Vaals (NL); Jan Scheurich, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 162 days.

(21) Appl. No.: 15/319,912

(22) PCT Filed: Jul. 25, 2014

(86) PCT No.: PCT/EP2014/066008
§ 371 (c)(1),
(2) Date: Dec. 19, 2016

(87) PCT Pub. No.: WO2016/012051
PCT Pub. Date: Jan. 28, 2016

(65) Prior Publication Data
US 2017/0126588 A1 May 4, 2017

(51) Int. Cl.
*H04L 12/935* (2013.01)
*H04L 12/833* (2013.01)
(Continued)

(52) U.S. Cl.
CPC .......... *H04L 49/30* (2013.01); *H04L 12/4633* (2013.01); *H04L 47/31* (2013.01); *H04L 49/70* (2013.01)

(58) Field of Classification Search
CPC ................................ H04L 45/00; H04L 12/28
See application file for complete search history.

(56) References Cited

U.S. PATENT DOCUMENTS

| | | | | |
|---|---|---|---|---|
| 2009/0154358 A1* | 6/2009 | Kanda | ................... | H04L 47/10 370/237 |
| 2010/0030969 A1* | 2/2010 | Basham | .............. | G06F 12/0806 711/126 |

(Continued)

FOREIGN PATENT DOCUMENTS

| | | | |
|---|---|---|---|
| WO | 2011053973 A1 | 5/2011 | |
| WO | WO-2011053973 A1 * | 5/2011 | ............. H04L 49/35 |

OTHER PUBLICATIONS

Open Networking Foundation; "OpenFlow Switch Specification"; Mar. 27, 2014; pp. 1-171; Version 1.3.4 (Protocol version 0x04).

(Continued)

*Primary Examiner* — Hong S Cho
(74) *Attorney, Agent, or Firm* — Coats & Bennett, PLLC (57) ABSTRACT

A technique for packet ingress processing and packet egress processing in an OpenFlow, OF, switch is presented. A method aspect directed to packet ingress processing comprises receiving a packet at an OF port. The packet is associated with one of multiple logical flow entities, such as logical ports, allocated to the OF port. In a next step, the logical flow entity associated with the received packet is determined. Then, metadata for the packet is tagged with an identifier for the logical flow entity associated with the packet. The tagging controls handling of the packet at egress processing. The packet handling, in turn, may include a selective dropping or passing of the packet.

15 Claims, 8 Drawing Sheets

(51) Int. Cl.
    *H04L 12/931*    (2013.01)
    *H04L 12/46*     (2006.01)

(56) References Cited

U.S. PATENT DOCUMENTS

| | | | |
|---|---|---|---|
| 2013/0089089 A1 | 4/2013 | Kamath et al. | |
| 2014/0371880 A1* | 12/2014 | Lee ........................ | G05B 15/02 700/20 |
| 2015/0381428 A1* | 12/2015 | Ong ........................ | H04L 41/12 709/223 |

OTHER PUBLICATIONS

Open Networking Foundation; "OpenFlow Switch Specification"; Oct. 14, 2013; pp. 1-205; Version 1.4.0 (Wire Protocol 0x05).

Open Networking Foundation; "OpenFlow Switch Specification"; XP055176059; Retrieved from the internet: URL:http//www.opennetworking.org/images/stories/downloads/sdn-resources/onf-precifications/openflow/openflow-specv1.3.3.pdf [retrieved on Mar. 11, 2015]; Sep. 27, 2013; pp. 1-164; Version 1.3.3 (Protocol version 0x04); ONF TS-016.

Open Networking Foundation; "OpenFlow Switch Specification"; Sep. 6, 2012; pp. 1-128; Version 1.3.1 (Wire Protocol 0x04); ONF TS-007.

\* cited by examiner

PACKET PROCESSING IN AN OPENFLOW SWITCH

TECHNICAL FIELD

The present disclosure generally relates to packet processing. In particular, a technique for packet ingress and packet egress processing in an OpenFlow switch is presented. The technique may be practiced in the form of methods, apparatuses, an OpenFlow switch and a computer program product.

BACKGROUND

In modern communications networks the processes of packet forwarding on the one hand and forwarding control on the other hand are logically separated. Packets are forwarded on the so-called data plane, while forwarding control happens on the so-called control plane.

Conventional network switches are configured so that packet forwarding on the data plane and forwarding control on the control plane take place within the same physical device. To overcome the technical limitations resulting therefrom, software-defined networking (SDN) has been proposed. SDN decouples the data plane from the control plane. While the data plane is still implemented in the switch itself, the control plane is implemented as software in a separate SDN controller that configures the forwarding states on the data plane. Based on these states, forwarding decisions are taken. For this reason the SDN controllers need no longer be co-located with the switches in a single physical device, and a single SDN controller can control multiple switches.

OpenFlow (hereinafter OF) is a communication protocol that is used to define packet forwarding in an SDN environment. OF enables an external SDN controller to configure a forwarding path through one or multiple OF switches. An OF switch therefore will be configured in accordance with the OF protocol (the current version is 1.4.0 of 15 Oct. 2013) or will be compatible therewith.

Each OF switch comprises one or more flow tables for packet ingress processing (e.g., lookup operations) and a group table for packet egress processing (e.g., forwarding operations). A communication channel stretches from each OF switch to each external SDN controller for communication based on the OF protocol. Using the OF protocol, the SDN controller can add, update and delete flow entries in the flow tables. Moreover, the SDN controller can control actions to be performed on the packets via the group table. Such control actions include forwarding control.

An OF switch is coupled to other network components (including other OF switches) via OF ports. An OF port is a network interface for passing packets between OF processing in the OF switch and the other network components. The OF switch receives packets on an ingress port. Each received packet keeps its ingress port as a property during packet ingress processing. As such, the ingress port can be used for flow table lookup operations and thus for packet forwarding control (also referred to as flow control herein). As an example, the ingress port of a packet can be used to direct that packet to an associated output port upon egress processing.

In the case of multicast or broadcast forwarding to multiple output ports, egress processing has a pre-configured setting that prevents a packet from being output via its ingress port. If a packet is actually to be output via its ingress port, an extra group table has to be written and set up by the SDN controller to include a dedicated output action to that port.

It has been found that the pre-configured OF setting that prevents a packet from being output via its ingress port does not scale well in certain traffic scenarios. For example, in an SDN environment it is often desirable to define multiple logical flow entities to permit, for example, a flow level isolation of those entities with respect to different packet transport services emulated by a particular OF switch. When, in such a scenario, a first and a second of the logical flow entities are allocated to the same OF ingress port of that OF switch, the preconfigured OF setting would prevent a packet of the first logical flow entity from being output to the second logical flow entity as both entities are allocated to the same output port. This problem could be addressed by writing and setting up an extra group table, but for N logical flow entities it would require the definition of $2^N$ (sub-) groups (and $2^N$ flow entries in a separate flow table to select the right group). Evidently, this scaling behaviour technically prevents allocating a large number of logical flow entities to a single OF port.

SUMMARY

There is a need for a technique that permits a more efficient processing of logical flow entities in an OF switch.

According to a first aspect a method of packet ingress processing in an OF switch is presented. The method comprises receiving a packet at an OF port, wherein the packet is associated with one of multiple logical flow entities allocated to the OF port; determining the logical flow entity associated with the received packet; and tagging metadata for the packet with an identifier for the logical flow entity associated with the packet, wherein the tagging controls handling of the packet at egress processing.

The OF port may be an ingress port of the OF switch. The metadata may take the form of information communicated between flow tables of the OF switch.

The multiple logical flow entities may be representative of multiple logical ports allocated to the OF port. In such a case, the tagging may mark the packet as having been received via a particular logic port. The logical ports may be defined within an SDN environment. In one variant, each logical port is representative of an aggregate network flow within the SDN environment mapped to that logical port.

The logical flow entities, for example in terms of logical ports, may define a flow level separation for packets in relation to at least one packet transport service emulated by the OF switch. At least two logical flow entities may be bound to the same packet transport service. As such, the same packet transport service may be provided to at least two logical flow entities allocated to one and the same OF port.

The logical flow entity associated with the received packet is defined by at least one encapsulation attribute of that packet. In one variant, the encapsulation attribute can (e.g., uniquely) be mapped to a logical flow entity. For instance, the mapping may associate identifiers of logical flow entities on the one hand and encapsulation attributes on the other. The identifier for the logical flow entity associated with the received packet may be determined based on an OF flow table. In such a case, the OF flow table may define mappings between encapsulation attributes and identifiers for logical flow entities.

A hierarchical relationship may be defined among the multiple logical flow entities. Specifically, each logical flow entities may be associated with one dedicated hierarchy level.

As an example, the received packet may be associated with a first logical flow entity on a first flow hierarchy level and a second logical flow entity on a second flow hierarchy level, wherein the second logical flow entity comprises at least two different first logical flow entities on the first flow hierarchy level. In such a scenario both the first logical flow entity and the second logical flow entity may be determined. Based on such a determination, the metadata for the packet can be tagged with both a first identifier for the first logical flow entity and a second identifier for the second logical flow entity. Of course, the above example could be extended to three or more hierarchy levels.

In another example, the dedicated hierarchy level of an individual logical flow entity may be associated with a particular one of hierarchically arranged protocol layers (such as L1, L2 or L3). As such, each identifier may define the protocol layer in which a particular packet transport service is to be provided.

According to a further aspect a method of packet egress processing in an OF switch is presented. The method comprises receiving a packet associated with one of multiple logical flow entities allocated to a OF port; receiving metadata for the packet, the metadata being tagged with an identifier for the logical flow entity associated with the received packet; matching the identifier for the logic flow entity with at least one predefined identifier; handling the packet dependent on a result of the matching.

The handling of the packet dependent on the matching result may be realized in various ways. For example, depending on the matching result the packet may selectively be dropped. Alternatively, the packet may selectively be passed (e.g., towards outside the OF switch) dependent on the matching result. Of course, the packing handling dependent on the matching result could alternatively, or additionally, comprise selectively subjecting the packet to one or more specific processing operations, such as packet inspection (e.g., deep packet inspection), packet marking (e.g., via adding, changing or removing an encapsulation attribute), and so on.

The multiple logical flow entities may be representative of multiple logical ports allocated to the OF port. In such a case, the packet handling may include selectively dropping the packet to prevent the packet received on one logical port to egress via the same logical port.

The matching and dropping steps are in one variant performed as an OF action. The OF action may be performed in connection with OF group processing. For OF group processing a dedicated OF action bucket may be provided for each logical flow entity allocated to the OF port.

In a hierarchal arrangement of the logical flow entities, the received packet may be associated with a first logical flow entity on a first flow hierarchy level and a second logical flow entity on a second flow hierarchy level, wherein the second logical flow entity comprises at least two different first logical flow entities on the first flow hierarchy level. The received metadata for the packet may be tagged with both a first identifier for the first logical flow entity and a second identifier for the second logical flow entity. Then, the matching can be performed individually for the first identifier and the second identifier on the basis of a first predefined identifier and a second predefined identifier, respectively.

The method may also comprise extracting the identifier for the logic flow entity by a logical AND operation on the metadata and a bit mask. In a hierarchical scenario, a first bit mask may be used to extract the first identifier and a second bit mask may be used to extract the second identifier.

The method may further comprise passing the packet as a result of the matching. As such, the packet will not be dropped. The passed packet may be forwarded via one of broadcast and multicast.

Also provided is a computer program product comprising program code portions for performing the steps of any of the methods and method aspects presented herein when the computer program product is executed by a computing device. The computer program product may be stored on a computer readable recording medium, such as a semiconductor memory, hard disk, CD-ROM or DVD. The computer program product may also be provided for download via a network connection.

According to a still further aspect, an apparatus for packet ingress processing in an OF switch is provided. The apparatus is configured to receive a packet at an OF port, wherein the packet is associated with one of multiple logical flow entities allocated to the OF port; to determine the logical flow entity associated with the received packet; and to tag metadata for the packet with an identifier for the logical flow entity associated with the packet, wherein the tagging is configured to control handling of the packet at egress processing.

Also provided is an apparatus for packet egress processing in an OF switch, wherein the apparatus is configured to receive a packet associated with one of multiple logical flow entities allocated to a OF port; to receive metadata for the packet, the metadata being tagged with an identifier for the logical flow entity associated with the received packet; to match the identifier for the logic flow entity with at least one predefined identifier; and to handle the packet dependent on a result of the matching.

The apparatuses may be configured to perform any of the methods and method steps presented herein.

An OF switching device comprising the apparatuses for packet ingress and packet egress processing is provided also. The device may be configured as on OF switch conforming or compatible with the OF protocol.

BRIEF DESCRIPTION OF THE DRAWINGS

Further aspects, details and advantages of the present disclosure will become apparent from the following description of exemplary embodiments and the drawings, wherein.

DETAILED DESCRIPTION

In the following description of exemplary embodiments, for purposes of explanation and not limitation, specific details are set forth, such as particular logical flow entities and packet transport services, in order to provide a thorough understanding of the technique presented herein. It will be apparent to one skilled in the art that the technique presented herein may be practiced in other embodiments that depart from these specific details. For example, while the following embodiments will exemplarily be described in connection with a packet handling operation that includes selectively dropping or passing packets at egress processing, it will be understood that the selective packet handling at egress processing could also comprise other selective operations, such as packet inspection, packet marking, packet distribution, and so on.

Moreover, those skilled in the art will appreciate that certain methods, functions and procedures presented herein may be implemented using software in conjunction with a programmed microprocessor, digital signal processor or general purpose computer. For example, the present disclosure may be embodied in a computer program product which can be loaded on a computer system that comprises one or more processors and one or more memories, wherein the one or more memories are configured to store one or more programs that perform certain methods, functions and procedures disclosed herein when run on the one or more processors of the computer system.

Within the context of this specification, the term "action" refers to an operation that, for instance, forwards the packet to a port, modifies the packet (such as decrementing a time to live, TIL, field) or changes its state (such as associating it with a queue). Actions may be specified as part of an instruction set associated with a flow entry or in an action bucket associated with a group entry. Actions may be accumulated in an action set of the packet or applied immediately to the packet.

Within the context of this specification, the term "action bucket" refers to a set of actions and associated parameters in a group. The group will select one (or more) buckets for each packet.

Within the context of this specification, the term "action set" refers to a set of actions associated with the packet, that are accumulated while the packet is processed by each of one or more tables and that are executed when the instruction set instructs the packet to exit a processing pipeline.

Within the context of this specification, the term "flow table" refers to a stage of the processing pipeline. A flow table comprises flow entries.

Within the context of this specification, the term "flow entry" refers to an element in a flow table used to match and process packets. A flow entry typically comprises a set of match fields for matching packets, a priority for matching precedence, a set of counters to track packets, and a set of instructions to apply.

Within the context of this specification, the term "group" refers to a list of action buckets and some means of choosing one or more of those buckets for application on a per-packet basis.

Within the context of this specification, the term "metadata" refers to a maskable register value or any other data structure that is used to carry information, for example, from one table to the next.

Within the context of this specification, the term "match field" refers to a field part of a flow entry against which a packet is matched. Match fields can match one or more of various packet header fields, a packet ingress port, a metadata value and other pipeline fields. A match field may be wildcarded (match any value) and/or in some cases bitmasked (match subset of bits).

Within the context of this specification, the term "matching" refers, inter alia, to comparing the set of header fields and pipeline fields of a packet to the match fields of a flow entry.

Within the context of this specification, the term "pipeline" refers to the set of linked flow tables that provide one or more of matching, forwarding, and packet modification in an OF switch.

Within the context of this specification, the term "port" refers, inter alia, to an entry/exit point where packets enter and exit the OF pipeline. A port may be a physical port, a logical port defined by the OF switch, or a reserved port defined by the OF protocol, in particular the OF switch protocol.

Figure 1:
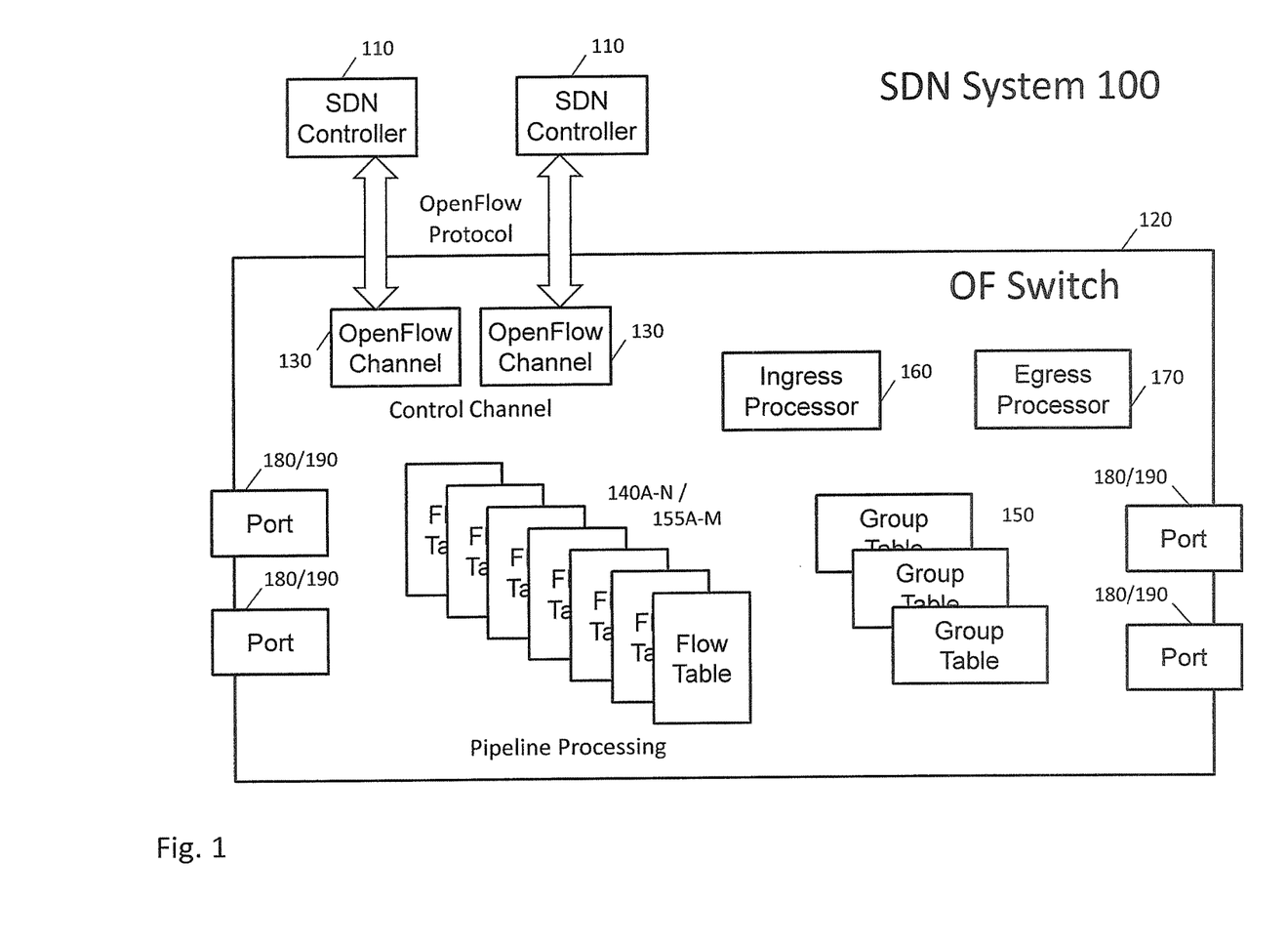
FIG. 1 schematically illustrates an embodiment of an SDN system comprising a SDN controllers and an OF switch.

FIG. 1 schematically illustrates an embodiment of an SDN system 100 comprising one or multiple SDN controllers 110 and an OF switch 120 controlled by the one or multiple SDN controllers 110. Each SDN controller 110 and the OF switch 120 are configured to communicate with each other via the OF protocol. To this end, the OF switch 120 comprises one or several OF channels 130, one per controlling SDN controller 110. The SDN controllers 110, the OF switch 120 and the OF channels 130 will generally be compliant or compatible with the OF specification(s), such as the OpenFlow Switch Specification (Version 1.4.0 of 15 Oct. 2013) or any other version thereof, such as Version 1.3.4 of 27 Mar. 2014.

The OF switch 120 of FIG. 1 comprises multiple flow tables 140A to 140N and 155A to 155M, wherein flow tables 140A to 140N are used for ingress pipeline processing and flow tables 155A to 155M are used for egress pipeline processing (referred to as ingress flow tables 140 or egress flow tables 155, respectively, in their entirety). It should be noted that in certain embodiments the flow tables 155A to 155M, and thus egress pipeline processing, may be omitted. In such a case, instead of egress table processing, "simple" group processing may be performed.

Each of the flow tables 140/155 contains a set of one or more flow entries and each flow entry comprises one or more match fields, counters and instruction sets to be applied to matching packets, as generally defined in the OpenFlow Switch Specification. Instructions include actions (e.g., packet forwarding, packet modification and group table processing) and pipeline processing (e.g., sending of packets to subsequent tables and communication of information in the form of metadata between tables).

The flow tables 140/155 of the OF switch 120 are sequentially numbered, starting at 0. As said, pipeline processing happens in the present embodiment in two stages, ingress processing and egress processing. The separation of the two stages is indicated by the first egress table 155A, wherein all tables with a number lower than the first egress table 155A are used as ingress tables 140, and no table with a number higher than first egress table 155A is used as an ingress table 140.

Pipeline processing starts with receiving a packet at an ingress port 180 and ingress processing at the first flow table 140A having number 0. The received packet is first matched against flow entries of flow table 140A. Other ingress flow tables 140 may be used depending on the outcome of the match in the first table 140A. If the outcome of ingress processing is to forward the packet to an output port 190, the OF switch 120 performs egress processing in the context of that output port 190. If no valid egress table 155 is configured as the first egress table, the packet is processed by the output port, and typically the packet is forwarded out of the OF switch 120. If a valid egress table 155 is configured as the first egress table 155A, the packet is matched against flow entries of that flow table 155A, and other egress flow tables 155 may be used depending on the outcome of the match in that flow table 155A.

The action set for egress processing has one restriction: both the output action and the group action cannot together be added to the egress action set. The action set for egress processing is initialized at the beginning of egress processing with an output action for the current output port 190, whereas the action set for ingress processing starts empty.

The output action is processed differently in ingress and egress processing. When the ingress action set contains an output action or a group action forwarding the packet to an output port 190, the packet must start egress processing on that port 190. When the egress action set contains an output action, the packet must exit egress processing and must be processed by the port 190, and typically it is forwarded out of the OF switch 120.

If the action list contains an output action, a clone (copy) of the packet is forwarded in its current state to the desired port 190, where it starts egress processing. If the output action references a non-existent port, the clone of the packet is dropped. If the action list contains a group action, a clone of the packet in its current state is processed by the relevant group buckets. Any modifications done to a clone of the packet generated by the output or group action, for example in a group bucket or an egress table 155, applies only to that clone and does not apply to the original packet or other clones.

As explained above, flow tables 140, 155 are in the present embodiment used for either ingress or egress processing. Ingress processing is typically the main processing that happens when the packet enters the OF switch 120, and may involve one or more ingress flow tables 140. Egress processing is the processing that happens after determination of the output port 190, it happens in the context of the output port 190 and may involve zero or more flow tables 155.

There are not many differences between flow tables 140, 155 used for ingress and egress processing. The flow entries have the same components, flow table matching is the same, and execution of instructions is the same. Table miss processing is the same, and therefore the SDN controller 110 should set a table-miss flow entry in each egress table to avoid dropped packets.

At the beginning of ingress processing, the action set is empty. Flow tables 140 used for ingress processing can only direct packets via a Goto-Table instruction to further ingress flow tables 140, and cannot direct packets to egress flow tables 155 using the Goto-Table instruction. Ingress flow 140 tables usually do not support the Action Set Output match field, but may support it in some cases.

At the beginning of egress processing, the action set contains only an output action for the current output port 190. Flow tables 155 used for egress processing can only direct packets via the Goto-Table instruction to further egress flow tables 155. They support the Action Set Output match field, to allow flows to be based on the output port context. They restrict the use of an output action or group action in write-action instruction, so that the output port 190 cannot be changed. Those restrictions are advertised in the flow table features.

The egress flow tables 155 may support the output action or group action in apply-action instruction. Those actions behave like they do in an ingress flow table 140; they forward clones of the packet to the specified ports 190, and those clones must start egress processing from the first egress table 155 A. This can be used for example for selective egress mirroring.

Table pipeline processing based on ingress flow tables 140 stops when the instruction set associated with a matching flow entry does not specify a next ingress table 140. In this case the packet is usually modified (if needed) and forwarded (e.g., to a specific output port 190). Actions associated with flow entries may also direct packets to a group which specifies further processing ("group processing").

A group table 150 in the OF switch 120 contains group entries for individual groups. Each group entry contains a list of action buckets. The actions in an action bucket are applied to all packets sent to the group. Groups may be used to define more complex forwarding semantics (e.g., in terms of multicast or broadcast forwarding and an associated packet cloning).

In the present embodiment the OF switch 120 further comprises a packet ingress processor 160 and a packet egress processor 170. The packet processors 160, 170 may, for example, be realized in the form of one or more microprocessors (e.g., Central Processing Units, CPUs) and an associated memory storing program code for controlling the one or more microprocessors to perform the operation of the packet processors 160, 170 when executing the program code. In other realizations, the packet processors 160, 170 may be realized in the form of one or more ASICs or otherwise.

The packet processors 160, 170 are in the present embodiment generally configured to control a selective dropping or passing, or forwarding, of packets that belong to multiple logical flow entities allocated to one OF port of the OF switch 120. Within the scope of the present disclosure, dropping a cloned packet and refraining from cloning a packet are understood to be also encompassed by the expression "packet dropping".

The selectivity in packet dropping permits a granular control (e.g., suppression) of egress traffic on an OF port. The granularity level can be lower than the OF port level, and the lower granularity level can be defined via the logical flow entities. The logical flow entities may thus constitute granular service creation and control points for SDN-based packet transport services. Examples of such packet transport services to be emulated by the OF switch 120 include service chaining, emulated local area networks (ELANs), virtual Home Gateways, virtual private LAN services (VPLSs) for split horizon, residential broadband switching, private VLAN, and VxLAN based overlay solution for network virtualization in a cloud.

In some embodiments the logical flow entities are realized as logical ports different from (i.e., not modeled as) OF ports. As an example, the logical ports may be defined for a flow level separation of the received packets in relation to the packet transport services emulated by the OF switch 120. The same physical port and same OF port can host multiple logical ports which can be bound to same service.

Figure 2:
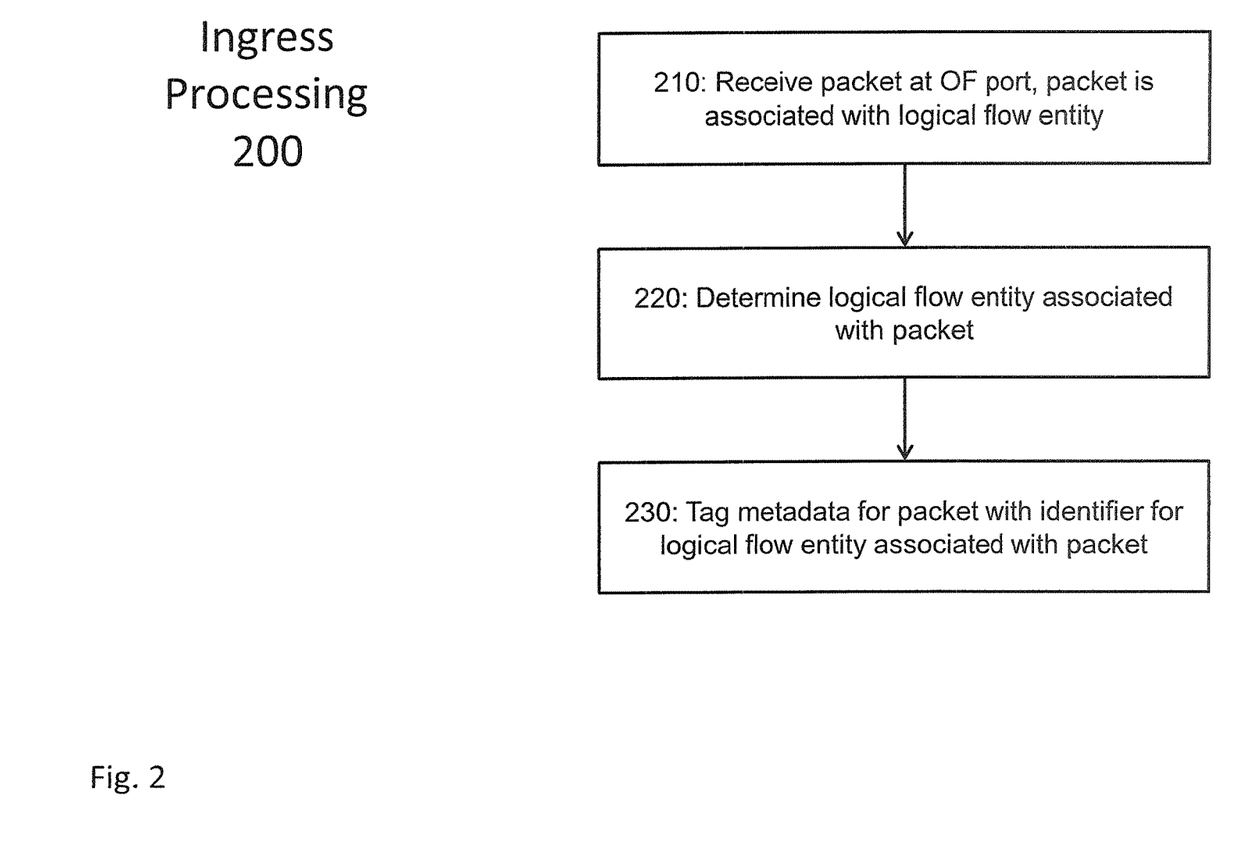
FIG. 2 is a flow diagram of a method embodiment of packet ingress processing.

FIG. 2 illustrates a flow diagram 200 of a method embodiment that may be performed in the OF switch 120 of FIG. 1 upon packet ingress processing by the ingress processor 160. The flow diagram 200 will be described in connection with the processing stages of the OF switch 120 illustrated in FIG. 3.

Figure 3:
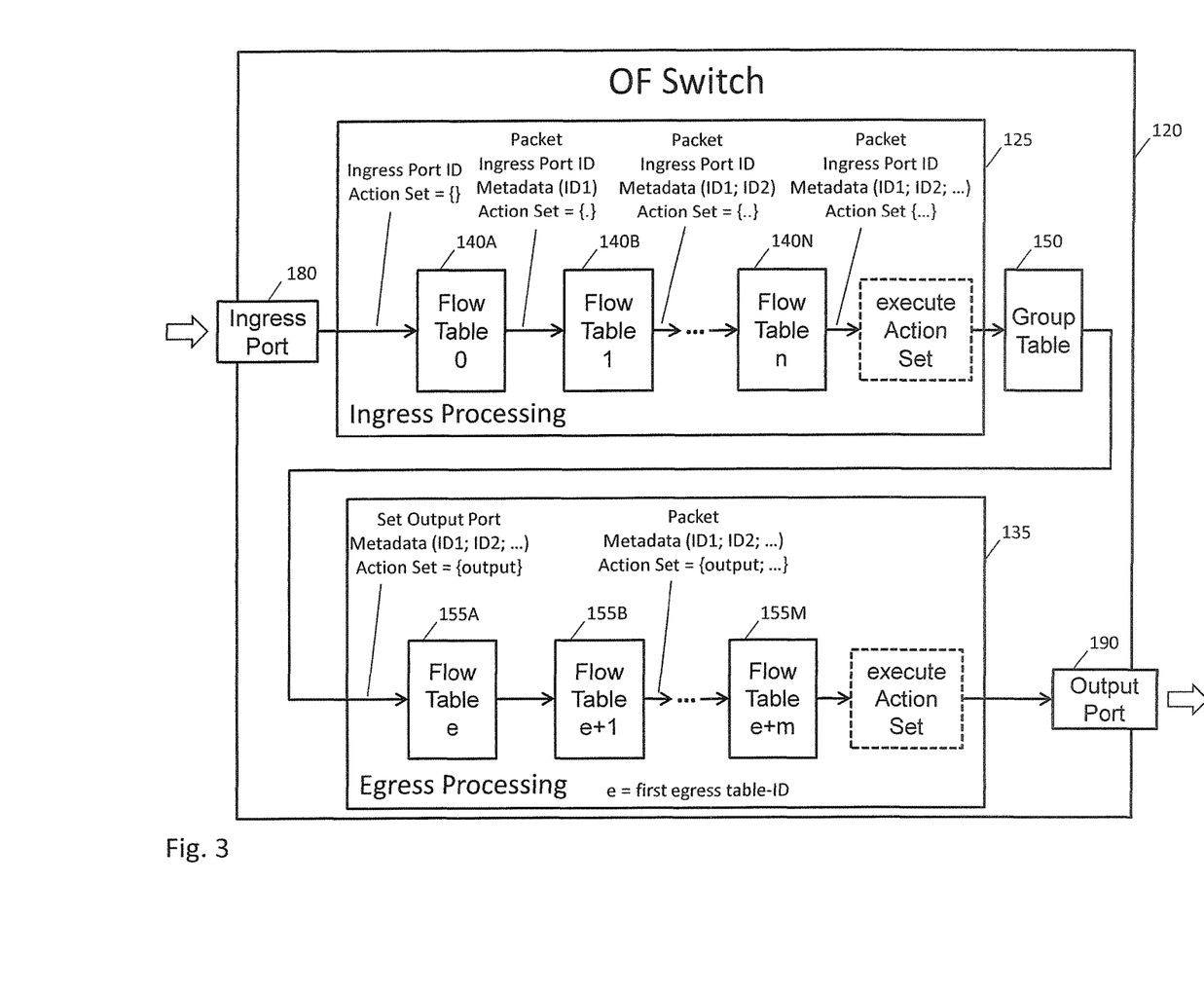
FIG. 3 is a schematic diagram of an embodiment of processing stages involved in packet ingress and egress processing.

In a first step 210 a packet is received at an ingress port 180 of the OF switch 120 (see also FIG. 3). The ingress port 180 can be a logical port or a physical port. In the present embodiment, the ingress port 180 is associated with an identifier (Ingress Port ID) that can be communicated among the flow tables 140. The packet received in step 210 is associated with one of multiple logical flow entities allocated to the ingress port 180. It should be noted that in certain realizations each ingress port 180 could also be used as output port 190.

Figure 4:
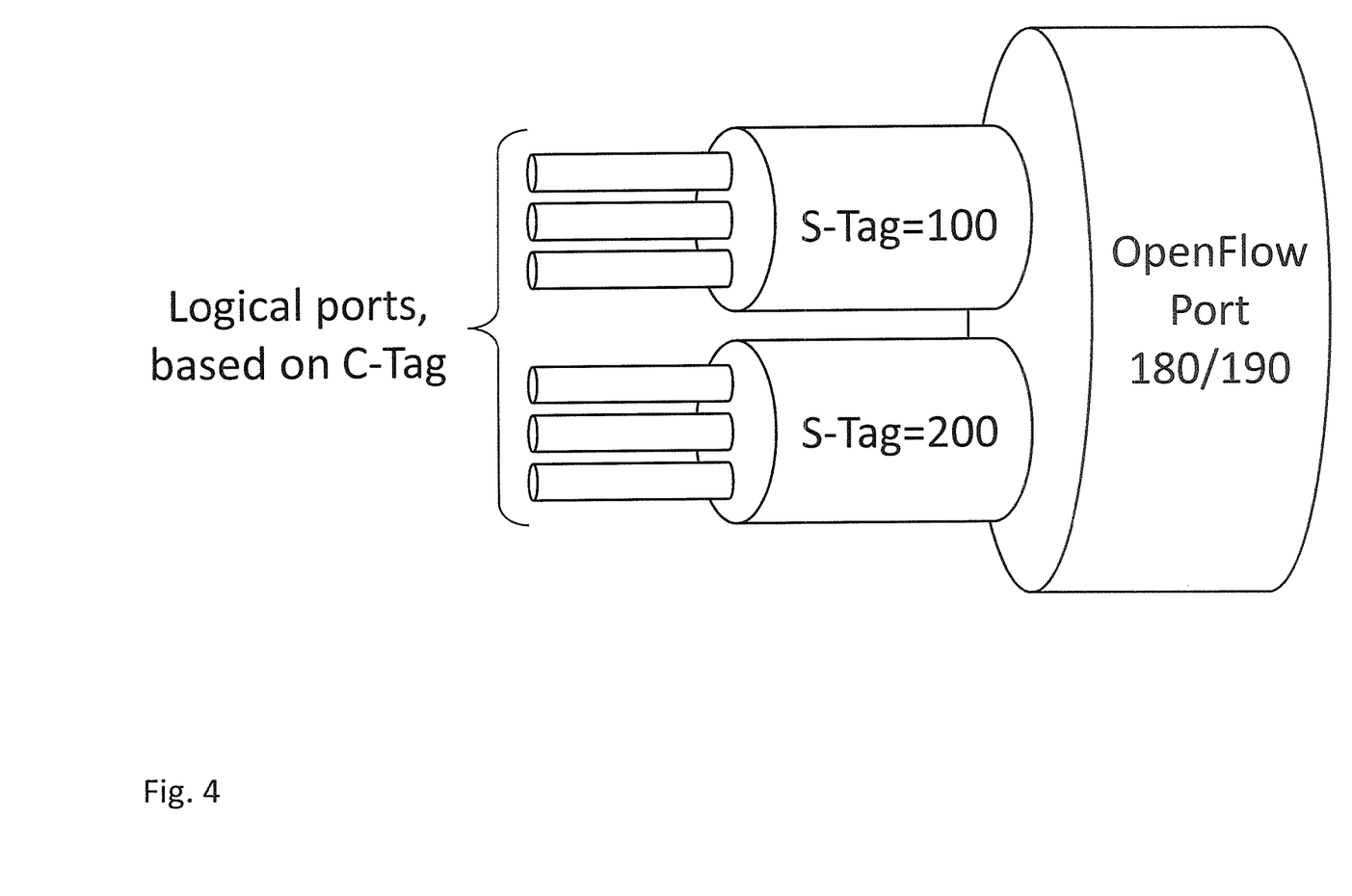
FIG. 4 schematically illustrates an embodiment of a hierarchical relationship among logical flow entities.

FIG. 4 schematically illustrates for a VLAN (e.g., in accordance with IEEE 802.1Q) on top of an Ethernet network the concept of logical flow entities. As shown in FIG. 4, packets associated with particular VLAN customer tags (C-Tags) are grouped to form first logical flow entities, or logical ports, on a first flow hierarchy level. Individual ones of the logical flow entities (C-Tags) are aggregated to second logical flow entities, or logical ports, on a second flow hierarchy level identified by VLAN service tags (S-Tags). As such, each logical flow entity on the second flow hierarchy level comprises one or multiple different logical flow entities on the first flow hierarchy level. The logical flow entities on the first hierarchy level and on the second flow hierarchy level are allocated to the ingress port 180 (e.g., via a mapping of S-Tags to the Ingress Port ID of ingress port 180).

Returning to FIG. 2, in a next step 220 the logical flow entity, or logical port, associated with the packet received in step 210 at ingress port 180 is determined. To this end one or more encapsulation attributes of the received packet are inspected. The inspection is carried out in the context of pipeline processing based on flow entries in the flow tables 140 as will now be explained in more detail with reference to FIG. 3.

In the exemplary case shown in FIG. 3, the received packet is first associated with the identifier of the ingress port 180 (Ingress Port ID) and an empty action set Action Set { }. Then pipeline processing on the basis of the first flow table 140A is started. The flow table 140A will generally define a mapping between one or more particular encapsulation attributes and one or more identifiers for logical flow entities. In the specific example illustrated in FIG. 4, an individual S-Tag or an individual C-Tag encapsulation attribute may, for example, be mapped to the identifier of a particular logical flow entity (e.g., logical port ID). The identifiers of the logical flow entities need only be unique within the OF switch 102.

As an example derived from FIG. 4, it could be determined in step 220 that the packet received in step 210 is associated with the logical flow entity given by a particular S-Tag. This particular S-Tag, in turn, may be mapped in an entry of the flow table 140A on the exemplary logical port identifier ID1. As a result of this matching in step 220, metadata for the received packet will in step 230 be tagged with that identifier ID1 as shown in FIG. 3. This tagging then controls selective dropping of the packet at egress processing, or any other packet handling operation at egress processing.

As illustrated in FIG. 3, the output of the matching performed on the basis of flow table 140A are the packet itself, the Ingress Port ID, metadata comprising logical port identifier ID1 as a tag, and an optional action set (indicated in the figure as Action Set {.}, showing that some action may be added to the previously empty Action Set). Immediate actions can also be applied to the packet, for example to remove the detected encapsulation attributes from the head of the packet.

This information is input to the following flow table 140B. Flow table 140B may, for example, be used for matching between lower level encapsulation attributes (such as C-Tags; see FIG. 4) and associated logical port identifiers.

In such a case, the metadata output after processing based on the flow table 140B may be tagged with two identifiers pertaining to different flow hierarchy levels (e.g., ID1 for a given S-Tag and ID2 for a given C-Tag).

This pipeline processing allows matching of further (deeper) encapsulation attributes to further metadata output. After processing in the final ingress flow table 140N, ingress pipeline processing is finished and the accumulated action set is executed. Afterwards the processing continues in group table 150.

A group table 150 generally comprises a list of action buckets and some means of choosing one or more of those buckets to apply. The ability for a flow entry to point to a group enables the OF approach to represent dedicated methods of forwarding, such as "select" and "all". For "all" all buckets in the group are executed. This group is used for multicast or broadcast forwarding. The packet is effectively cloned for each bucket; one packet is processed for each bucket of the group.

For "select" one bucket of the group is executed. The corresponding choice can be based on a switch-computed selection algorithm, e.g., a hash on some user-configured tuple or simple round robin.

Now the packet and the aggregated metadata are subjected to packet egress processing by the egress processor 170. As explained above, packet egress processing comprises pipeline processing and/or group processing.

Figure 5:
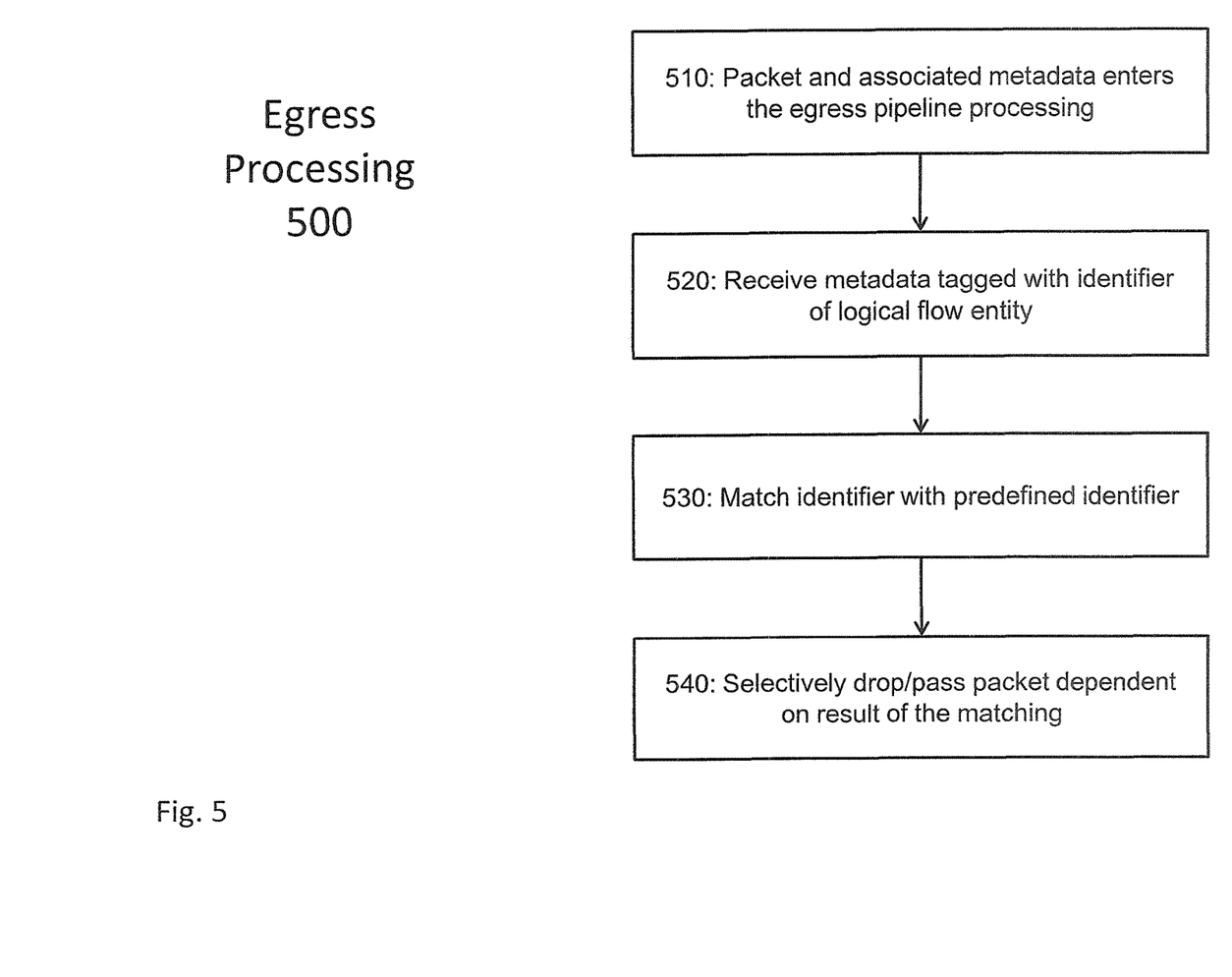
FIG. 5 is a flow diagram of a method embodiment of packet egress processing.

FIG. 5 shows a flow diagram 500 of packet egress processing. As illustrated in FIG. 3, egress processing is triggered on the basis of an action bucket of the group table 150. As a result of the group processing operations, an individual packet is either dropped or passed for forwarding via one of broadcast and multicast over at least one of the output ports 190 of the OF switch 120. It should be noted that the output port 190 could be identical to or different from the ingress port 180 of the packet.

Egress processing starts in step 510 with receipt of the packet from the group table 150. The packet is received together with the associated metadata (step 520) and an action set initialized to comprise the output port 190. As explained above, the metadata comprise one or more identifiers of the one or more logical flow entities comprising the packet.

Then, in step 530, as an OF action performed in connection with table pipeline processing, the one or more identifiers in the metadata are matched with one or more predefined identifiers. In this regard, a dedicated OF action bucket may be provided in OF table processing for each logical flow entity, or logical port, allocated to the OF port 180.

Step 530 may comprise identifier extraction from the metadata. The extraction may be performed in various ways, for example by applying a bit mask on the metadata by a logical AND operation. In the case of multiple flow hierarchy levels, different bit masks may be defined to extract identifiers that pertain to different flow hierarchy levels. The bit mask and matching concepts performed in step 530 will be explained in more detail with respect to exemplary OF actions below.

In a further step 540 the packet is dropped (or passed) dependent on a result of the matching. Specifically, in the case of a match, the packet is dropped to prevent the packet that was received on one logical port (i.e., that is associated with one logical flow entity) to egress via the same logical port (i.e., via the same logical flow entity). Such a dropping can be advantageous in the case of broadcast and multicast forwarding operations provided by the OF switch 120. If, on the other hand, no identifier match can be identified during egress processing, the packet is passed to the output port 190 to be multicast or broadcast. Within the scope of the Open-Flow Switch Specification the multicasting and broadcasting can be based on clones of the received packet. It will be appreciated that in case the packet is associated with logical flow entities on different flow hierarchy levels (as shown, for example, in FIG. 4), the matching in step 540 can be performed individually for identifiers associated with different flow hierarchy levels.

As has already been explained above, step 540 may comprise additional or alternative packet handling operations depending on the matching result. For this reason the selective dropping or passing of a packet is just one example for a selective packet handling operation. As another example, the packets may selectively be marked (e.g., via an encapsulation attribute) in accordance with certain prioritization rules. Such rules may, for example, influence packet handling in the network outside the OF switch 120.

The matching of identifiers (derived from the metadata) with predefined identifiers is in one exemplary variant done by using a dedicated egress pipeline processing table 155 per hierarchy level. In the same manner as the hierarchy levels have been determined and handled during ingress pipeline processing, during egress processing the dropping/passing or any other decision is performed. If the result is that the packet shall pass, the corresponding encapsulation attributes (as shown, for example, in FIG. 4) are added to the processed packet. This can be achieved by corresponding immediate actions or as part of the accumulated action set.

The accumulated action set is executed as the very last step of egress processing, just before the packet is forwarded out of the OF switch 120.

Figure 6:
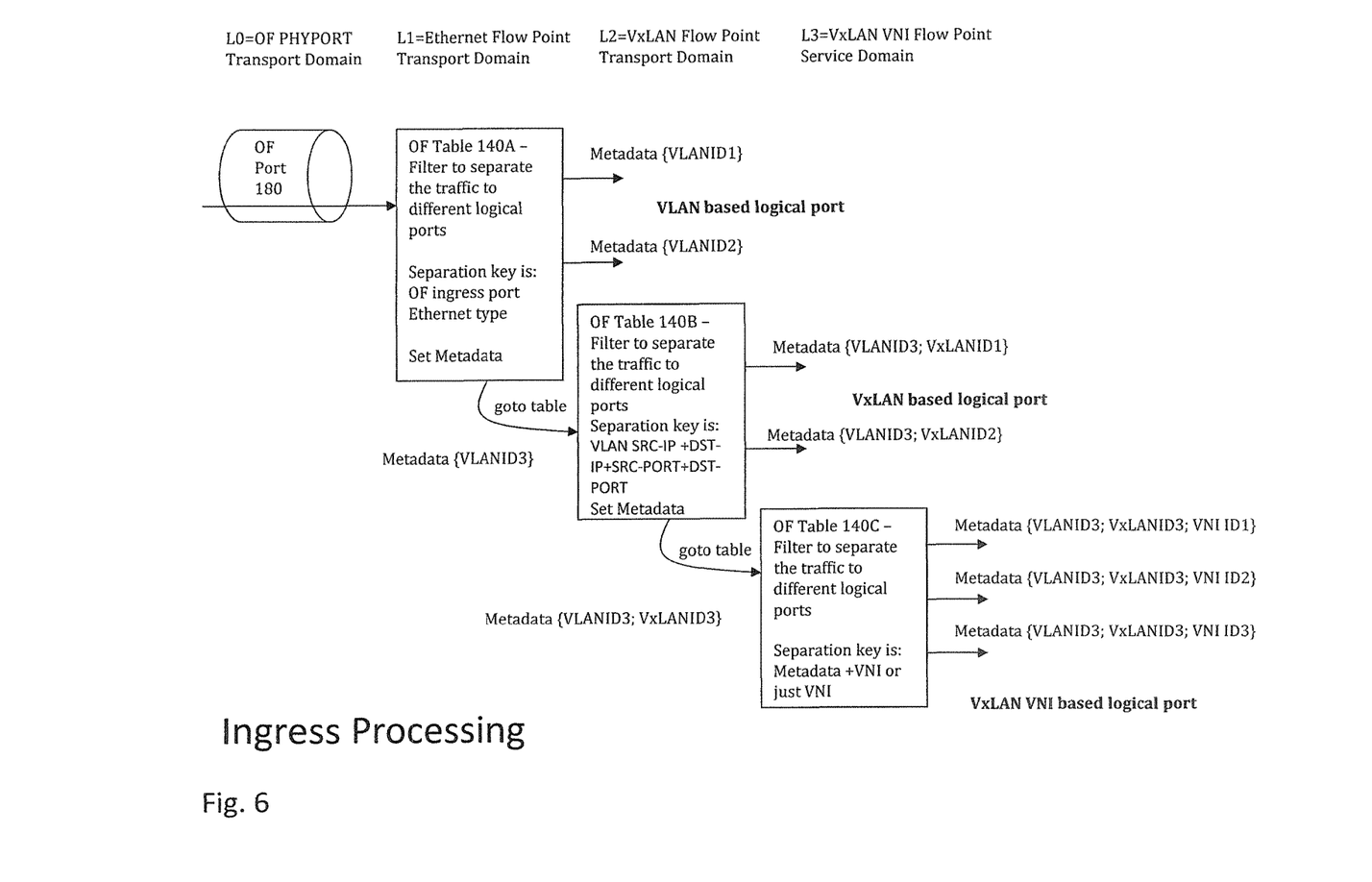
FIGS. 6, 7 schematically illustrate more specific examples of packet ingress and packet egress processing in relation to different protocol layers.
Figure 7:
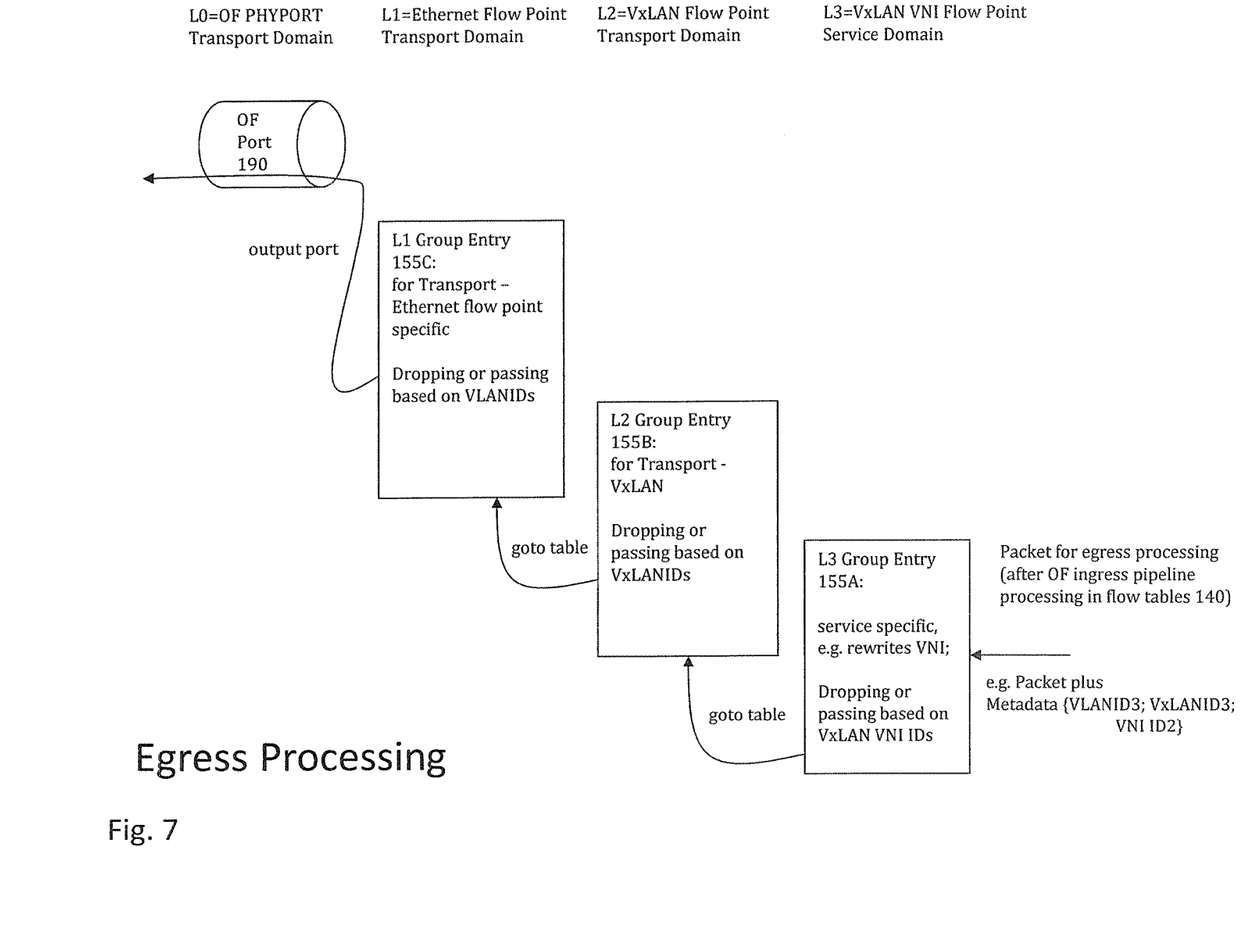
Figure 8:
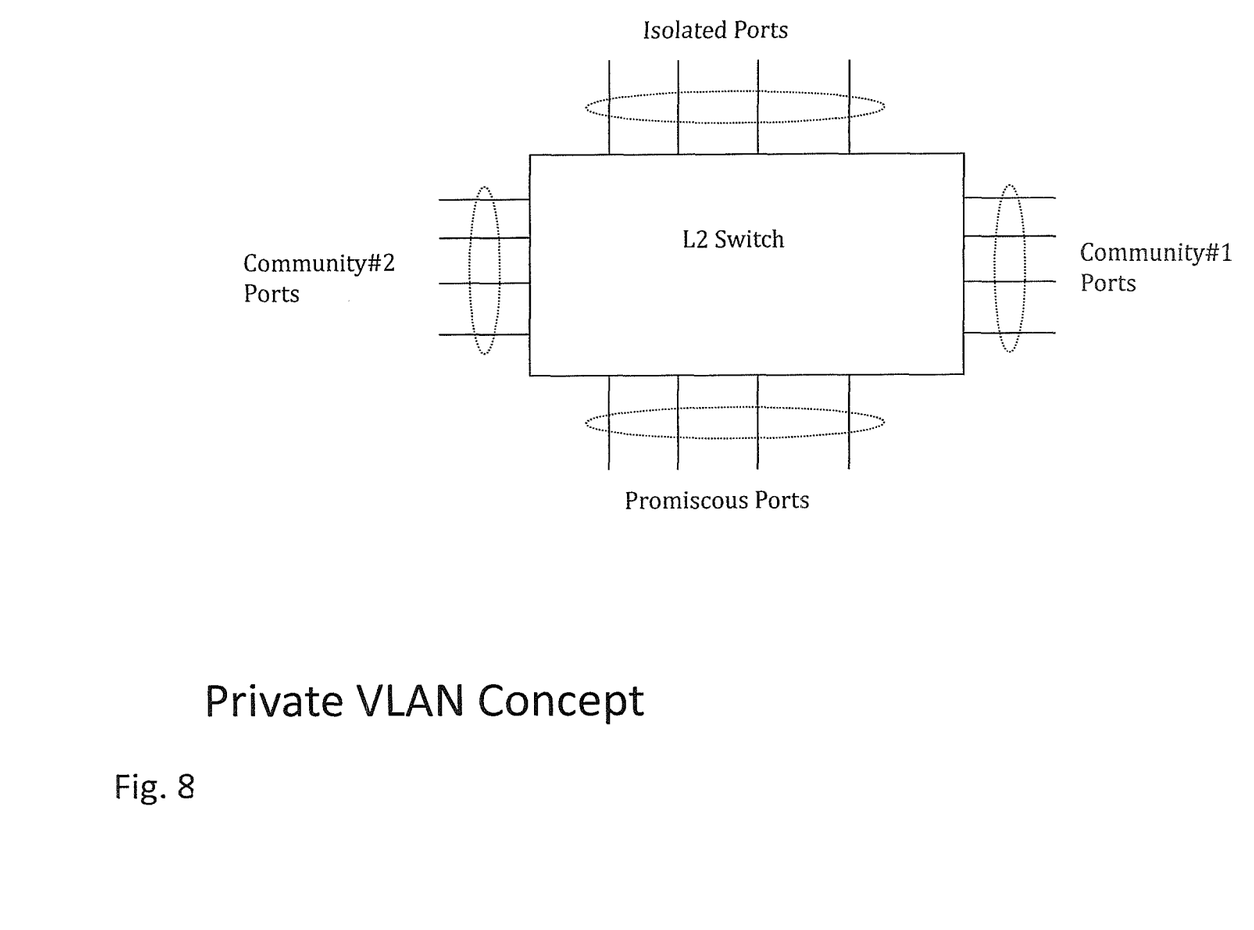
FIG. 8 schematically illustrates an embodiment of a Private LAN concept.

FIGS. 6 (for packet ingress processing) and 7 (for packet egress processing) show further examples of the operations performed by the packet processors 160, 170 in the exemplary scenario of a layered processing arrangement comprising L0 (OF physical transport domain), L1 (Ethernet transport domain), L2 (VxLAN transport domain) and L3 (VxLAN VNI service domain).

As illustrated in FIG. 6, a packet ingressing via port 180 is subjected to three flow tables 140A, 140B, 140C associated with L1, L2, L3, respectively. The flow tables perform traffic separation and add metadata that permits a selective packet dropping upon egress processing. As illustrated in FIG. 7, there is a dedicated group entry 155A, 155B, 155C associated with L1, L2, L3, respectively. Each table entry is configured to realize matching as well as dropping/passing actions as described herein.

The operations carried out by the packet egress processor 170 in steps 530 and 540 in FIG. 5 and in the scenario illustrated in FIG. 7 are in one embodiment implemented the form of one or more new action types for group processing or table processing (see also FIG. 2), in the following called FilterEqualMask and FilterUnEqualMask. From implementation perspective this will require OF data plane enhancements as well as OF protocol and SDN control enhancements.

In detail, the new action types could be defined as follows:
FilterEaualMask (MASK, VALUE)
This action will work on the OF METADATA REGISTER (64-bit). This METADATA Register may be realized as per the OpenFlow Switch Specification. VALUE is indicative of an identifier of an individual logical flow entity (e.g., a logical port ID).

The predicate for this instruction is as follows:

If ((METADATA & MASK) == VALUE)
    DROP the PACKET
Else
    Pass the PACKET FIlterUnEqualMask (MASK, VALUE 1, VALUE 2)
This action will also work on METADATA REGISTER (64-bit) as explained above, but for two identifiers of logical flow entities.
The predicate for this instruction is as follows:

If (((METADATA & MASK) == VALUE_1) || ((METADATA & MASK) == VALUE_2))
    PASS the PACKET
Else
    DROP the PACKET In more general terms, the operations carried out by the processor 170 could be implemented using one or more of the following action types:
FilterEqualMask (OF OXM Match Field, MASK, VALUE)
This action will work on any OF OXM Match field.
The predicate for this instruction is as follows:

If ((OF_OXM_MATCH_FIELD & MASK) == VALUE)
    DROP the PACKET
Else
    Pass the PACKET FIlterUnEqualMask ((OF_OXM_MATCH_FIELD, Mask, VALUE_1), (OF_OXM_MATCH_FIELD, Mask, VALUE_2), (OF_OXM_MATCH_FIELD, Mask, VALUE_n))
This action will work on any OpenFlow OXM match field.
The predicate for this instruction is as follows:

If (((OF_OXM_MATCH_FIELD & MASK) == VALUE_1). || (( OF_OXM_MATCH_Field& MASK) == VALUE_n) )
    PASS the PACKET
Else
    DROP the PACKET FIlterOpMask ((OF_OXM_MATCH_FIELD, Mask, VALUE_1, OPx), (OPy) (OF_OXM_MATCH_FIELD, Mask, VALUE_2, OPx), (OPy)(OF_OXM_MATCH_FIELD, Mask, VALUE_n, OPx))
This action will work on any OF OXM match field. Here, OPx is a mathematical operator like {equal, greater than, less than, not equal}. Similarly OPy is a logical operator as OPy={AND, OR}.
The predicate for this instruction is as follows:

If (((OF_OXM_MATCH_FIELD & MASK) OPx VALUE_1). OPy (( OF_OXM_MATCH_Field& MASK) OPx VALUE_n) )
    PASS the PACKET
Else
    DROP the PACKET Here OPx is a mathematical operator={EQUAL TO (==), NOT EQUAL (!=), GREATER THAN (>), LESS THAN (<)}. Similarly OPy is a logical operator={AND (&), OR (||)}.

In the above, the example action taken is always packet drop, but the action can be different as well.

The following examples capture some of the use cases for advanced SDN services that can be implemented on the basis of the SDN system 100 illustrated in FIG. 1 in connection with the method embodiments illustrated in FIGS. 2 and 5.

- Packet forwarded back on ingress logical port (basic transparent bridging-ELAN)
- Packet forwarded back on core facing interface in a fully meshed architecture (split-horizon support required for VPLS in MPLS network for loop avoidance)
- Packet forwarded back on only on a subset of logical port in Layer2 domain (e.g., ISOLATED port, COMMUNITY port, NORMAL port support in Private VLAN use case]
- Residential broadband switching before hitting the IP service edge
- E-TREE SDN services The above examples will now be described in more detail with reference to the above action types.

ELAN

- Multiple Logical Ports hosted on same OF ports can bind to same Layer 2 domain
- For packet expansion case for broadcast and destination lookup failure (DLF) case—a copy of packets needs to be forwarded on all logical ports other than ingress logical ports. This is called SPLIT HORIZON.
- As Packet is ingressing through a logical port, a SPLIT_HORIZON_TAG is assigned to the METADATA.
- The group entry for the egress path of this logical port will have following action configured—FilterEqualMask (MASK, SPLIT_HORIZON_TAG)
- As an example:
  - For logical port LPORT_ID=x say SPLIT_HORIZON_TAG (8-bit)=100 is configured as tag for identifying this logical port upon group processing.
  - This SPLIT_HORIZON_TAG is assigned to lower 8 bit of METADATA.
  - So METADATA will be 100.
  - The group entry for group processing will be configured with FilterEqualMask(0x00000000000000FF, 100) for LPORT_ID=x

VPLS

- All edge switching domain are connected through fully meshed MPLS tunnels in core
- VPLS is not supposed to use the Spanning Tree Protocol (STP) for loop avoidance
- VPLS uses the method of split-horizon
  - Any packet received on an MPLS tunnel will not be expanded towards the core on another MPLS tunnel. This packet will only be expanded towards the local attachment interfaces/logical ports.
  - Any packet received on local attachment interface/logical ports will be expanded on both local logical ports as well as on MPLS tunnels
- All attachment/local logical ports will be configured with different SPLIT_HORIZON_TAGs and all core facing logical ports will be configured with same SPLIT_HORIZON_TAG. All group entry for each logical port will be configured with FilterEqualMask (MASK, SPLIT_HORIZON_TAG).
- For example, a VPLS instance on a PE has 4 local logical ports and 3 core facing logical ports
  - Four local logical ports are assigned with the following values of SPLIT_HORIZON_TAG=100, 101, 102, 103
  - The egress part of four local logical ports, i.e., the group entry for group processing will be configured with the instructions:
    - FilterEqualMask(0x00000000000000FF,100),
    - FilterEqualMask(0x00000000000000FF,101),
    - FilterEqualMask(0x00000000000000FF,102),
    - FilterEqualMask(0x00000000000000FF,103)
  - Three core facing logical port identifiers will be configured with same SPLIT_HORIZON_TAG value, say it is 105.
  - The Egress part of three core logical ports i.e. group entry will be configured with the instructions—
    - FilterEqualMask(0x00000000000000FF,105),
    - FilterEqualMask(0x00000000000000FF,105),
    - FilterEqualMask(0x00000000000000FF,105)

Private VLAN

The private VLAN concept is used to provide the ability to isolate end hosts or switch ports at layer 2 and save the wastage of VLAN ID and IP Subnets. Consider a co-location environment in which a network operator must connect servers belonging to different customers to the Internet. These servers must be able to reach their first hop routers or other service appliance, but for security reasons, servers belonging to one customer must not be able to communicate with servers belonging to another. An obvious design solution for these requirements is to place each customer's servers in a separate VLAN, which also requires the assignment of a separate subnet per customer (even if they have only one server). This approach wastes both VLAN IDs and IP address space.

Private VLAN is a more elegant alternative, allowing multiple devices to reside in the same IP subnet and yet remain isolated from one another at layer 2 with a hierarchy as per following concepts (see FIG. 7):

- All ports in a layer 2 domain are divided into following port groups—Promiscuous/Normal port, Isolated/Private port, Community ports (there can be more than one community and each community will have multiple ports)
- Promiscuous or Normal ports can communicate to both Community port and Isolated ports
- Community ports can communicate to other ports with in same community and also Promiscuous/Normal ports but not with any Isolated ports
- Isolated ports can only communicate to promiscuous ports and will not communicate to any Isolated port as well as any Community port
- From the above explanation, it is clear that one needs two level of filtering, one for group level filtering and other is port level filtering. To meet this requirement, 8-bit SPLIT_HORIZON_TAG will be considered as two groups of bit map—first 4-bits will be port group and next 4-bit will be used for port level filtering. Please note that 8-bit is just an indicative number to showcase the concept.

The present application can realized based on the technique presented herein as follows:

The SPLIT_HORIZON_TAG value is considered as 8-bit value were the first 4 bits indicate Group Level Filtering and next 4-bits indicate port level filtering.

The assignment of SPLIT_HORIZON_TAG will be as follows (the format is X: Y, where X=port group tag and Y=logical port tag).

- Promiscuous Ports will be assigned SPLIT_HORIZON_TAG as follows:
  - 0:1, 0:2, 0:3, 0:4

Isolated Ports will be assigned SPLIT_HORIZON_TAG as follows:
1:1, 1:2, 1:3, 1:4
Community#1 port will be assigned SPLIT_HORIZON_TAG as follows:
2:1, 2:2, 2:3, 2:4
Community#2 port will be assigned SPLIT_HORIZON_TAG as follows:
3:1, 3:2, 3:3, 3:4
The group entry for Promiscuous ports will be configured as follows (for Promiscuous group there is no requirement for port group level filtering):
FilterEqualMask (0x00000000000000FF, 0x01)
FilterEqualMask (0x00000000000000FF, 0x02)
FilterEqualMask (0x00000000000000FF, 0x03)
FilterEqualMask (0x00000000000000FF, 0x04)
The Group entry for Isolated ports will be configured with the following actions (here both port group level filtering as well as port level filtering will be required):
Port Group Filters={FilterEqualMask (0x00000000000000F0, 0x01), FilterEqualMask (0x00000000000000F0, 0x02),FilterEqualMask (0x00000000000000F0, 0x03)} logical Port Filter=FilterEqualMask (0x00000000000000FF, 0x15)
Port Group Filter={FilterEqualMask (0x00000000000000F0, 1), FilterEqualMask (0x00000000000000F0, 2),FilterEqualMask (0x00000000000000F0, 3)}, Logical Port Filter=FilterEqualMask (0x000000000000000F, 0x16)
Port Group Filter={FilterEqualMask (0x00000000000000F0, 1), FilterEqualMask (0x00000000000000F0, 2),FilterEqualMask (0x00000000000000F0, 3)}, Logical Port Filter=FilterEqualMask (0x000000000000000F, 0x17)
Port Group Filter={FilterEqualMask (0x00000000000000F0, 1), FilterEqualMask (0x00000000000000F0, 2),FilterEqualMask (0x00000000000000F0, 3)}, Logical Port Filter=FilterEqualMask (0x000000000000000F, 0x18)
The Group entry will be configured with the actions for Community group #1
Port Group Filter=FilterUnEqualMask (0x00000000000000F0, 0, 2), Logical Port Filter=FilterEqualMask(0x00000000000000FF, 0x21)
Port Group Filter=FilterUnEqualMask (0x00000000000000F0, 0, 2), Logical Port Filter=FilterEqualMask(0x00000000000000FF, 0x22)
Port Group Filter=FilterUnEqualMask (0x00000000000000F0, 0, 2), Logical Port Filter=FilterEqualMask(0x00000000000000FF, 0x23)
Port Group Filter=FilterUnEqualMask (0x00000000000000F0, 0, 2), Logical Port Filter=FilterEqualMask(0x00000000000000FF, 0x24)
The Group entry will be configured with the actions for Community group #2.
Port Group Filter=FilterUnEqualMask (0x00000000000000F0, 0, 3), Logical Port Filter=FilterEqualMask(0x00000000000000FF, 0x31)
Port Group Filter=FilterUnEqualMask (0x00000000000000F0, 0, 3), Logical Port Filter=FilterEqualMask(0x00000000000000FF, 0x32)
Port Group Filter=FilterUnEqualMask (0x00000000000000F0, 0, 3), Logical Port Filter=FilterEqualMask(0x00000000000000FF, 0x33)
Port Group Filter=FilterUnEqualMask (0x00000000000000F0, 0, 3), Logical Port Filter=FilterEqualMask(0x00000000000000FF, 0x34)

ELAN Tree

E-TREE implementation is very similar to private VLAN. E-TREE also distinguishes root ports that have connectivity to all ports and leaf ports that can communicate to the root port only.

Residential Broadband Switching

Due to regulatory requirements no flow can be locally switched before hitting an IP service edge even though it may look optimal from network perspective. Similar to VPLS as explained above.

As has become apparent from the above embodiments, the technique presented herein supports granular control of dropping of packets on the egress side (i.e., in groups) of an OF switch based on filter criteria. One advantage of this technique is to drastically cut down on the number of flow and group entries that would be required to implement the same filtering functionality by means of standard flow table entries for decision and variants of a basic group for execution. This advantage is most clearly demonstrated by a basic ALL group with N buckets, where output to each bucket needs to be controlled individually as will now be explained in more detail.

OpenFlow has a mechanism to prevent a packet from going out on its ingress OF port. This mechanism is implemented through OF GROUP TYPE ALL (see section 5.6.1 of the OpenFlow Switch Specification—Execute all buckets in the group). This group is used for multicast or broadcast forwarding. The packet is explicitly cloned for each bucket; one packet is processed for each bucket of the group. If a bucket directs a packet explicitly out the ingress port, this packet clone is dropped. As explained above, this approach would require $2^N$ (sub-) groups and $2^N$ flow entries in a separate flow table to select the right group. Clearly this approach does not scale and would become a bottleneck for large ELANs with hundreds of logical port. On the other hand, the technique presented herein (e.g., for filtering ingress logical ports in a broadcasting scenario such as an E-LAN/VPLS broadcast) would only require N flow entries and N sub-groups, where the ingress logical port bucket is removed for an ALL group of N buckets.

The present invention has been described with reference to exemplary embodiments. It will be apparent to one skilled in the art that the present invention can be implemented in various other embodiments. The present invention is thus only limited by the scope of the claims that follow.

The invention claimed is:

1. A method of packet ingress processing in an OpenFlow (OF) switch, the method comprising:
receiving a packet at an OF port, wherein the packet is associated with one of multiple logical flow entities allocated to the OF port, wherein the multiple logical flow entities are representative of multiple logical ports allocated to the OF port;
determining the logical flow entity associated with the received packet;

tagging metadata for the packet with an identifier for the logical flow entity associated with the packet to mark the packet as having been received via a particular logical port;
wherein the tagging that marks the packet as having been received via a particular logical port controls handling of the packet at egress processing;
wherein the received packet is associated with a first logical flow entity on a first flow hierarchy level and a second logical flow entity on a second flow hierarchy level, wherein the second logical flow entity comprises at least two different first logical flow entities on the first flow hierarchy level;
wherein both the first logical flow entity and the second logical flow entity are determined; and
wherein the metadata for the packet are tagged with both a first identifier for the first logical flow entity and a second identifier for the second logical flow entity.

2. The method of claim 1, wherein the logical flow entities define a flow level separation for packets in relation to at least one packet transport service emulated by the OF switch.

3. The method of claim 2, wherein the same packet transport service is provided to at least two logical flow entities allocated to the OF port.

4. The method of claim 1, wherein the logical flow entity associated with the received packet is defined by at least one encapsulation attribute of that packet.

5. The method of claim 1, wherein the identifier for the logical flow entity associated with the received packet is determined based on an OF flow table.

6. The method of claims 5, wherein the OF flow table defines mappings between encapsulation attributes and identifiers for logical flow entities.

7. A method of packet egress processing in an OpenFlow (OF) switch, the method comprising:
receiving a packet associated with one of multiple logical flow entities allocated to an OF port, wherein the multiple logical flow entities are representative of multiple logical ports allocated to the OF port;
receiving metadata for the packet, the metadata being tagged with an identifier for the logical flow entity associated with the received packet to mark the packet as having been received via a particular logical port;
matching the identifier for the logical flow entity with at least one predefined identifier;
handling the packet based on a result of the matching;
wherein the received packet is associated with a first logical flow entity on a first flow hierarchy level and a second logical flow entity on a second flow hierarchy level,
wherein the second logical flow entity comprises at least two different first logical flow entities on the first flow hierarchy level;
wherein the received metadata for the packet are tagged with both a first identifier for the first logical flow entity and a second identifier for the second logical flow entity; and
wherein the matching is performed individually for the first identifier and the second identifier on the basis of a first predefined identifier and a second predefined identifier, respectively.

8. The method of claim 7, wherein the handling the packet includes selectively dropping the packet to prevent the packet received on one logical port to egress via the same logical port.

9. The method of claim 8, wherein the matching and the handling are performed as an OF action.

10. The method of claim 9, wherein the OF action is performed in connection with OF group processing or egress table processing.

11. The method of claim 10, wherein, for OF group processing, a dedicated OF action bucket is provided for each logical flow entity allocated to the OF port.

12. The method of claim 7, further comprising extracting the identifier for the logic flow entity by a logical AND operation on the metadata and a bit mask.

13. The method of claim 12, wherein a first bit mask is used to extract the first identifier and a second bit mask is used to extract the second identifier.

14. The method of claim 7:
wherein the handling the packet includes selectively passing the packet as a result of the matching;
wherein the passed packet is forwarded via one of broadcast and multicast.

15. An apparatus for packet egress processing in an OpenFlow (OF) switch, the apparatus comprising:
processing circuitry;
memory contacting instructions executable by the processing circuitry whereby the apparatus is operative to:
receive a packet associated with one of multiple logical flow entities allocated to a OF port, wherein the multiple logical flow entities are representative of multiple logical ports allocated to the OF port;
receive metadata for the packet, the metadata being tagged with an identifier for the logical flow entity associated with the received packet to mark the packet as having been received via a particular logical port;
match the identifier for the logical flow entity with at least one predefined identifier;
handle the packet based on a result of the matching;
wherein the received packet is associated with a first logical flow entity on a first flow hierarchy level and a second logical flow entity on a second flow hierarchy level, wherein the second logical flow entity comprises at least two different first logical flow entities on the first flow hierarchy level;
wherein the received metadata for the packet are tagged with both a first identifier for the first logical flow entity and a second identifier for the second logical flow entity; and
wherein the matching is performed individually for the first identifier and the second identifier on the basis of a first predefined identifier and a second predefined identifier, respectively.

* * * * *